(12) United States Patent
Nassor et al.

(10) Patent No.: US 8,774,538 B2
(45) Date of Patent: Jul. 8, 2014

(54) DECODING A SEQUENCE OF DIGITAL IMAGES WITH ERROR CONCEALMENT

(75) Inventors: Eric Nassor, Thorigne Fouillard (FR); Hervé Le Floch, Rennes (FR); Naël Ouedraogo, Maure de Bretagne (FR)

(73) Assignee: Canon Kabushiki Kaisha, Tokyo (JP)

(*) Notice: Subject to any disclaimer, the term of this patent is extended or adjusted under 35 U.S.C. 154(b) by 409 days.

(21) Appl. No.: 13/013,443

(22) Filed: Jan. 25, 2011

(65) Prior Publication Data

US 2011/0188766 A1   Aug. 4, 2011

(30) Foreign Application Priority Data

Jan. 29, 2010   (GB) .................................. 1001477.7

(51) Int. Cl.
*G06K 9/46* (2006.01)
*H04N 7/12* (2006.01)
*H04N 7/32* (2006.01)

(52) U.S. Cl.
CPC ..................................... *H04N 7/327* (2013.01)
USPC .................. 382/233; 375/240.25; 375/240.27

(58) Field of Classification Search
CPC ....................................................... H04N 7/68
USPC ................................................. 382/232–253
See application file for complete search history.

(56) References Cited

U.S. PATENT DOCUMENTS

| 7,248,633 B2* | 7/2007 | Ogura et al. ............. 375/240.27 |
| 2010/0074331 A1* | 3/2010 | Nishi ....................... 375/240.12 |

OTHER PUBLICATIONS

Cui et al., "Novel temporal error concealment algorithm based on residue restoration", WiCom '09, Sep. 24-26, 2009.*
Girod et al., "Distributed video coding", Proceedings of the IEEE, vol. 93, No. 1, pp. 71-83, Jan. 2005.*
Naccari, M., M. Tagliasacchi, S. Tubaro, P. Zontone, R. Rinaldo, and R. Bernardini. "Forward Error Protection for Robust Video Streaming Based on Distributed Video Coding Principles." The Institution of Engineering and Technology. IET, 2008. 747-52. The British Library. Web. Mar. 11, 2010.

* cited by examiner

*Primary Examiner* — Anand Bhatnagar
*Assistant Examiner* — Soo Park
(74) *Attorney, Agent, or Firm* — Canon U.S.A., Inc. IP Division

(57) ABSTRACT

A sequence of digital images encoded according to a predictive format is decoded using encoded auxiliary data which is representative of at least part of the sequence of digital images. A current encoded image, received with at least one detected error, is decoded. The decoding includes applying an error concealment decoding on at least part of the current encoded image containing such a detected error to obtain a first decoded image. An item of information representative of reconstruction errors is obtained based upon a reconstruction confidence of the error concealment decoding for at least one pixel of the error-containing part of the current image. The encoded auxiliary data and the first decoded image are processed based upon the item of information representative of reconstruction errors to obtain corrected auxiliary data. The first decoded image is modified to obtain a second decoded image based upon the corrected auxiliary data.

20 Claims, 10 Drawing Sheets

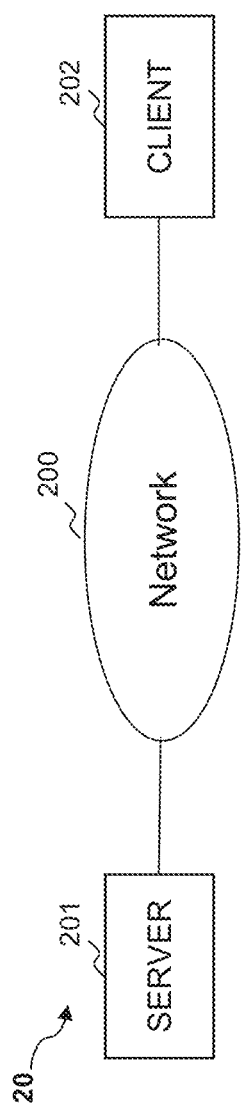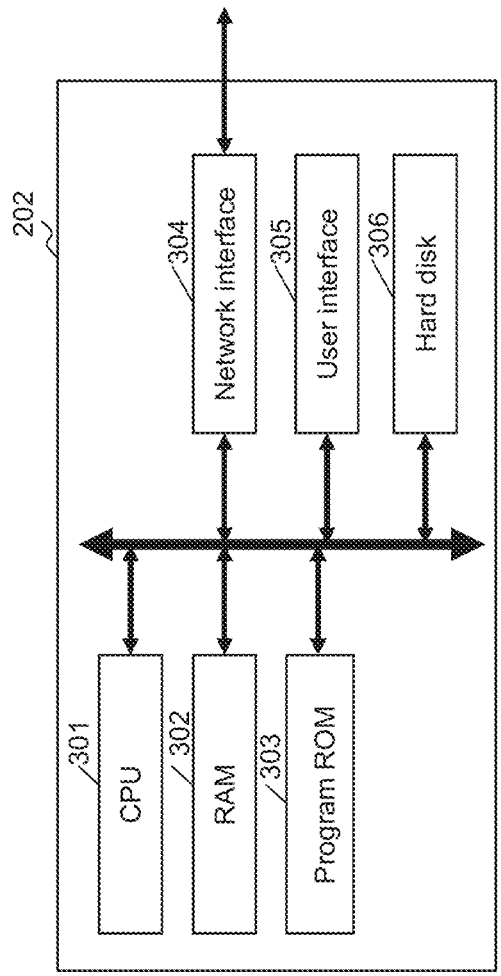

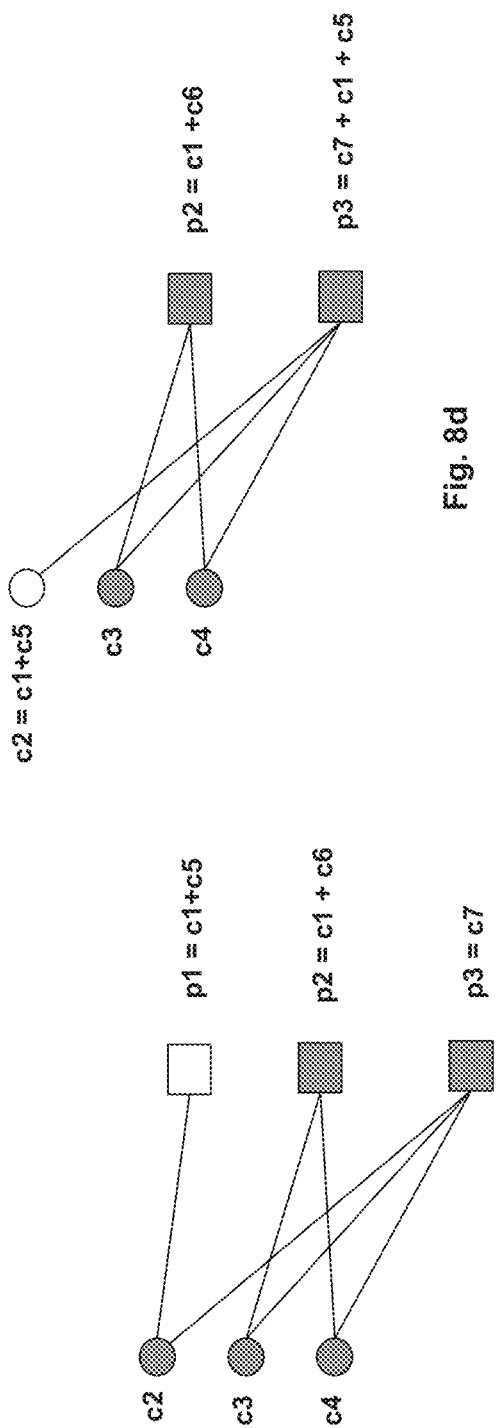
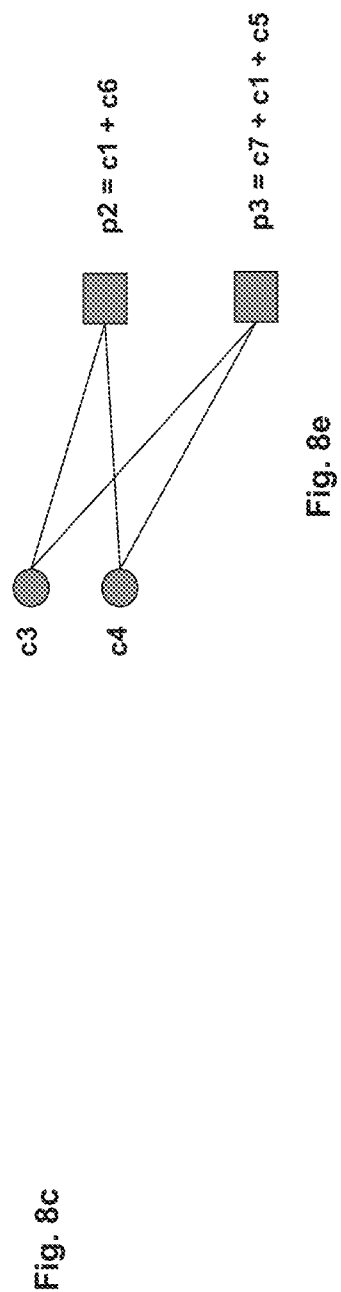
Fig. 8c
Fig. 8d
Fig. 8e

DECODING A SEQUENCE OF DIGITAL IMAGES WITH ERROR CONCEALMENT

BACKGROUND OF THE INVENTION

1. Field of the Invention

The present invention relates to a method and device for decoding a sequence of digital images with error concealment.

The invention belongs to the domain of video processing in general and more particularly to the domain of decoding with error concealment after the loss or corruption of part of the video data, for example by transmission through an unreliable channel.

2. Description of the Related Art

Compressed video sequences are very sensitive to channel disturbances when they are transmitted through an unreliable environment such as a wireless channel. For example, in an IP/Ethernet network using the UDP transport protocol, there is no guarantee that the totality of data packets sent by a server is received by a client. Packet loss can occur at any position in a bitstream received by a client, even if mechanisms such as retransmission of some packets or redundant data (such as error correcting codes) are applied.

In case of unrecoverable error, it is known, in video processing, to apply error concealment methods, in order to partially recover the lost or corrupted data from the compressed data available at the decoder.

Most video compression formats, for example H.263, H.264, MPEG1, MPEG2, MPEG4, SVC, use block-based discrete cosine transform (DCT) and motion compensation to remove spatial and temporal redundancies. They can be referred to as predictive video formats. Each frame or image of the video sequence is divided into slices which are encoded and can be decoded independently. A slice is typically a rectangular portion of the image, or more generally, a portion of an image. Further, each slice is divided into macroblocks (MBs), and each macroblock is further divided into blocks, typically blocks of 8×8 pixels. The encoded frames are of two types: predicted frames (either predicted from one reference frame called P-frames or predicted from two reference frames called B-frames) and non predicted frames (called INTRA frames or I-frames).

For a predicted P-frame, the following steps are applied at the encoder:
  motion estimation applied to each block of the considered predicted frame with respect to a reference frame, resulting in a motion vector per block pointing to a reference block of the reference frame. The set of motion vectors obtained by motion estimation form a so-called motion field;
  prediction of the considered frame from the reference frame, where for each block, the difference signal between the block and its reference block pointed to by the motion vector is calculated. The difference signal is called residual signal or residual data. A DCT is then applied to each block of residual data, and then, quantization is applied to the transformed residual data;
  entropic encoding of the motion vectors and of the quantized transformed residual data.

In the case of B-frames, two reference frames and two motion vectors are similarly used for prediction.

For an INTRA encoded frame, the image is divided into blocks of pixels, a DCT is applied on each block, followed by quantization and the quantized DCT coefficients are encoded using an entropic encoder.

In practical applications, the encoded bitstream is either stored or transmitted through a communication channel.

At the decoder side, for the classical MPEG-type formats, the decoding achieves image reconstruction by applying the inverse operations with respect to the encoding side. For all frames, entropic decoding and inverse quantization are applied.

For INTRA frames, the inverse quantization is followed by inverse block DCT, and the result is the reconstructed image signal.

For predicted type frames, both the residual data and the motion vectors need to be decoded first. The residual data and the motion vectors may be encoded in separate packets in the case of data partitioning. For the residual data, after inverse quantization, an inverse DCT is applied. Finally, for each predicted block in the P-frame, the signal resulting from the inverse DCT is added to the reconstructed signal of the block of the reference frame pointed out by the corresponding motion vector to obtain the final reconstructed image block.

A video bitstream encoded with such a predictive format is highly sensitive to transmission errors, since an error will not only result in an incorrectly decoded image but will also propagate to the following images if the affected image is used as a reference image.

Several methods are known in the related art to achieve resilience to transmission errors of video bit streams.

A classical method is to use Forward Error Correction (FEC) codes. An error correction code is computed on the compressed video bitstream and transmitted with the video bitstream. It is necessary to evaluate the maximum error rate in order to correctly evaluate the size of the error correction code. In practice, all errors are corrected until a maximum error rate is reached. As soon as the error rate is greater than the maximum error rate, the quality of correction becomes very bad. It would be interesting for the users to have a system with progressive quality degradation.

Another category of methods in the related art comprises the error concealment methods. The error concealment methods are applied at the decoder, in order to replace lost or corrupted areas with data obtained from correctly received data, based on spatial or temporal interpolations. The error concealment may provide progressive quality degradation when the error rate increases, but the efficiency of error concealment largely depends on the video content.

An approach proposed to improve the performance of error concealment is to systematically send some auxiliary data, based on the original video sequence, to help the error concealment. The auxiliary data can be generated using a Wyner-Ziv compression scheme. In a Wyner-Ziv compression scheme applied to video compression, auxiliary data is extracted from a video frame, and is correlated to the video frame. An information relative to the auxiliary data is sent to the decoder, so as to improve decoding. The information relative to the auxiliary data is compressed with respect to the auxiliary data and represents at least part of the auxiliary data, so that it can be used to correct an approximate auxiliary data extracted from the corresponding decoded frame at the decoder side.

The patent application US 20080267288 describes a system using Wyner-Ziv auxiliary data to correct missing parts of a video, as illustrated in FIG. 1. The video sequence encoding is carried out on the server device S. The video is classically encoded (module 1100) and transmitted to a client device C. Auxiliary data is extracted from the original video data (module 1110), and then encoded by module 1120 and transmitted to the client. For example, the auxiliary data is a quantized version of the video and the Wyner-Ziv auxiliary data transmitted is only an error correction code of the auxiliary data.

The client device C receives both the video bitstream data and the encoded auxiliary data. The module 1105 applies decoding and error concealment on the received bitstream. Then, an approximate version of the auxiliary data is extracted from the result of the error concealment decoding by the auxiliary data extraction module 1115. The error correction code of the auxiliary data received is used to correct the approximated version of the auxiliary data (module 1125). This corrected auxiliary data is then used by module 1135 to improve the image quality. The improved image may be stored to be used at a later stage as a reference image. Further, the improved image is sent as an output for further processing/display.

This related art does not take full advantage of the error concealment and of the auxiliary data to improve the quality of the final images.

There is still room to further improve the correction given a fixed quantity of auxiliary data or alternatively, at equal quality of the final image, to reduce the quantity of auxiliary data transmitted.

SUMMARY OF THE INVENTION

Aspects of the present invention can provide a method and a device for improving the quality of reconstruction of images of the video sequence, and can limit the error propagation in particular for images that depend on previous images which have been decoded using error correction and auxiliary data.

According to an aspect of the present invention a method of decoding a sequence of digital images encoded according to a predictive format uses encoded auxiliary data which is representative of at least part of the sequence of digital images. Such method includes decoding a current encoded image received with at least one detected error, including applying an error concealment decoding on at least part of the current encoded image containing such a detected error to obtain a first decoded image, obtaining an item of information representative of reconstruction errors based upon a reconstruction confidence of the error concealment decoding for at least one pixel of the part of the current image, processing the encoded auxiliary data and the first decoded image based upon the item of information representative of reconstruction errors to obtain corrected auxiliary data, and modifying the first decoded image to obtain a second decoded image based upon the corrected auxiliary data.

According to another aspect of the present invention a device for decoding a sequence of digital images encoded according to a predictive format uses encoded auxiliary data which is representative of at least part of the sequence of digital images. Such device includes a decoding unit configured to decode a current encoded image received with at least one detected error, the decoding unit applying an error concealment decoding on at least part of the current encoded image containing such a detected error to obtain a first decoded image, an obtaining unit configured to obtain an item of information representative of reconstruction errors based upon a reconstruction confidence of the error concealment decoding for at least one pixel of said part of the current image, a processing unit configured to process the encoded auxiliary data and the first decoded image based upon said item of information representative of reconstruction errors to obtain corrected auxiliary data, and a modifying unit configured to modify the first decoded image to obtain a second decoded image based upon the corrected auxiliary data.

Further features of the present invention will become apparent from the following description of exemplary embodiments (with reference to the attached drawings).

BRIEF DESCRIPTION OF THE DRAWINGS

FIG. 2 is a schematic example of a communication system in which the invention can be implemented.

FIG. 3 is a block diagram of a client device adapted to incorporate the invention.

FIG. 8A to 8E are illustrations LDPC decoding on a simple example.

DESCRIPTION OF THE EMBODIMENTS

Figure 1:
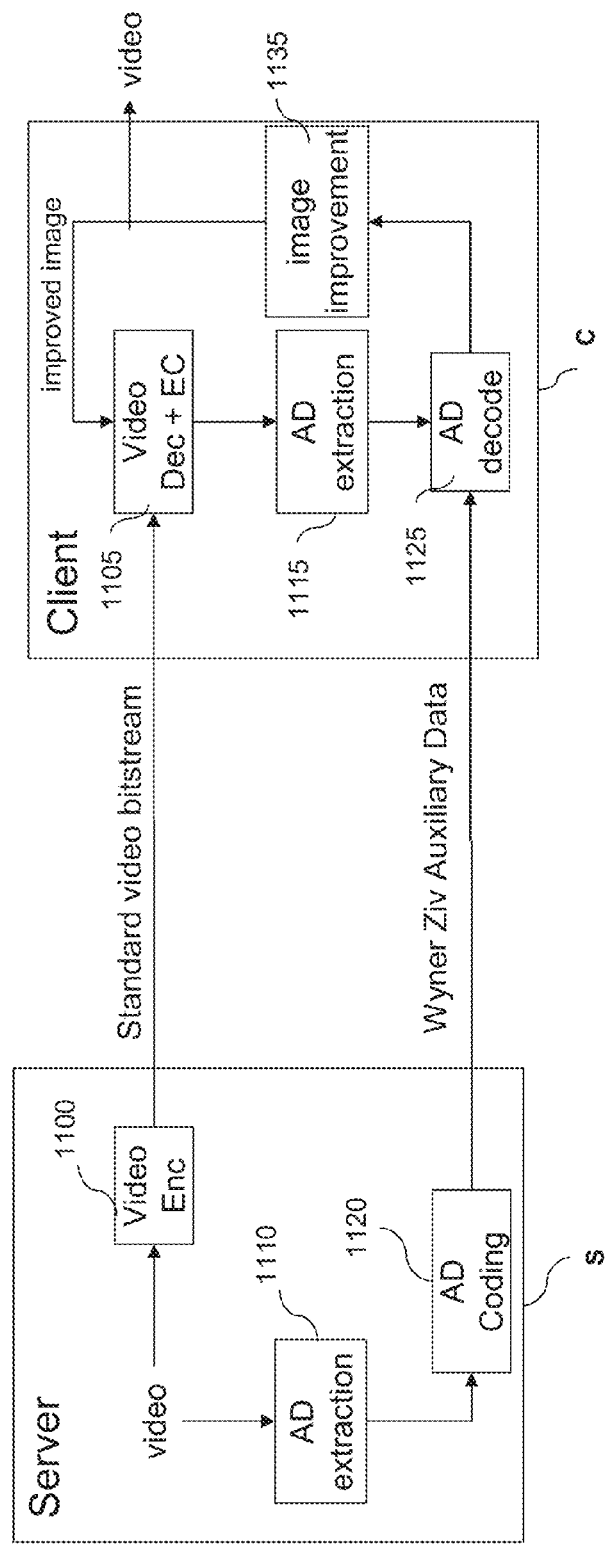
FIG. 1 is an illustration of a related art system for video sequence coding using Wyner-Ziv auxiliary data.

FIG. 2 represents a schematic example of a communication system 20 in which the invention can be implemented. The communication system 20 comprises a server device 201 which is adapted to transmit data packets of a data stream to a receiving device or client device 202, via a communication network 200.

The communication network 200 may for example be a wireless network (Wifi/802.11a or b or g), an Ethernet network, or the Internet network or a mixed network composed of several different networks.

The transmission over the communication network 200 is not reliable, some errors can occur during the transmission. In particular, data packets may be lost, in case of congestion or interferences.

The system 20 may be a broadcast system, in which server 201 sends data streams to a plurality of client devices 202 at the same time.

In an application scenario of the invention, the data stream sent between the server and the client is a video sequence, encoded using a predictive encoding format using motion compensation such as H264 or MPEG2. These formats provide compressed video data according to distortion-rate criteria, so as to provide videos at bitrates compatible with the bandwidth actually available on the network 200.

The encoded (and therefore compressed) video data are divided and encapsulated into transmission packets which are transmitted to the client 202 by the network 200 using a communication protocol, for example RTP (Real-time Transport Protocol) on UDP (User Datagram Protocol).

The client device receives the transmission packets, extracts data from the received packets to form the encoded stream and then decodes the stream to obtain decoded data, which can be either displayed or provided to a client application.

In case of transmission errors over the unreliable network 200, the client device applies error concealment to improve the quality of the decoded data. The embodiments of the invention as described below can be advantageously implemented by a client device 202 to enhance the quality of the decoded video data and limit the propagation of errors.

FIG. 3 illustrates a block diagram of a device, in particular a client device 202, adapted to incorporate the invention.

Preferably, the device 202 comprises a central processing unit (CPU) 301 capable of executing instructions from program ROM 303 on powering up, and instructions relating to a software application from main memory RAM 302 after the powering up. The main memory 302 is for example of Random Access Memory (RAM) type which functions as a working area of CPU 301, and the memory capacity thereof can be expanded by an optional RAM connected to an expansion port (not illustrated). Instructions relating to the software application may be loaded to the main memory 302 from a hard disk (HD) 306 or the program ROM 303 for example. Such software application, when executed by the CPU 301, causes the steps of the flowcharts shown in FIGS. 9 and 10 to be performed on the client.

Reference numeral 304 is a network interface that allows the connection of the device to the communication network. The software application when executed by the CPU 301 is adapted to receive data streams through the network interface from other devices.

Reference numeral 305 represents a user interface to display information to, and/or receive inputs from, a user.

Figure 4:
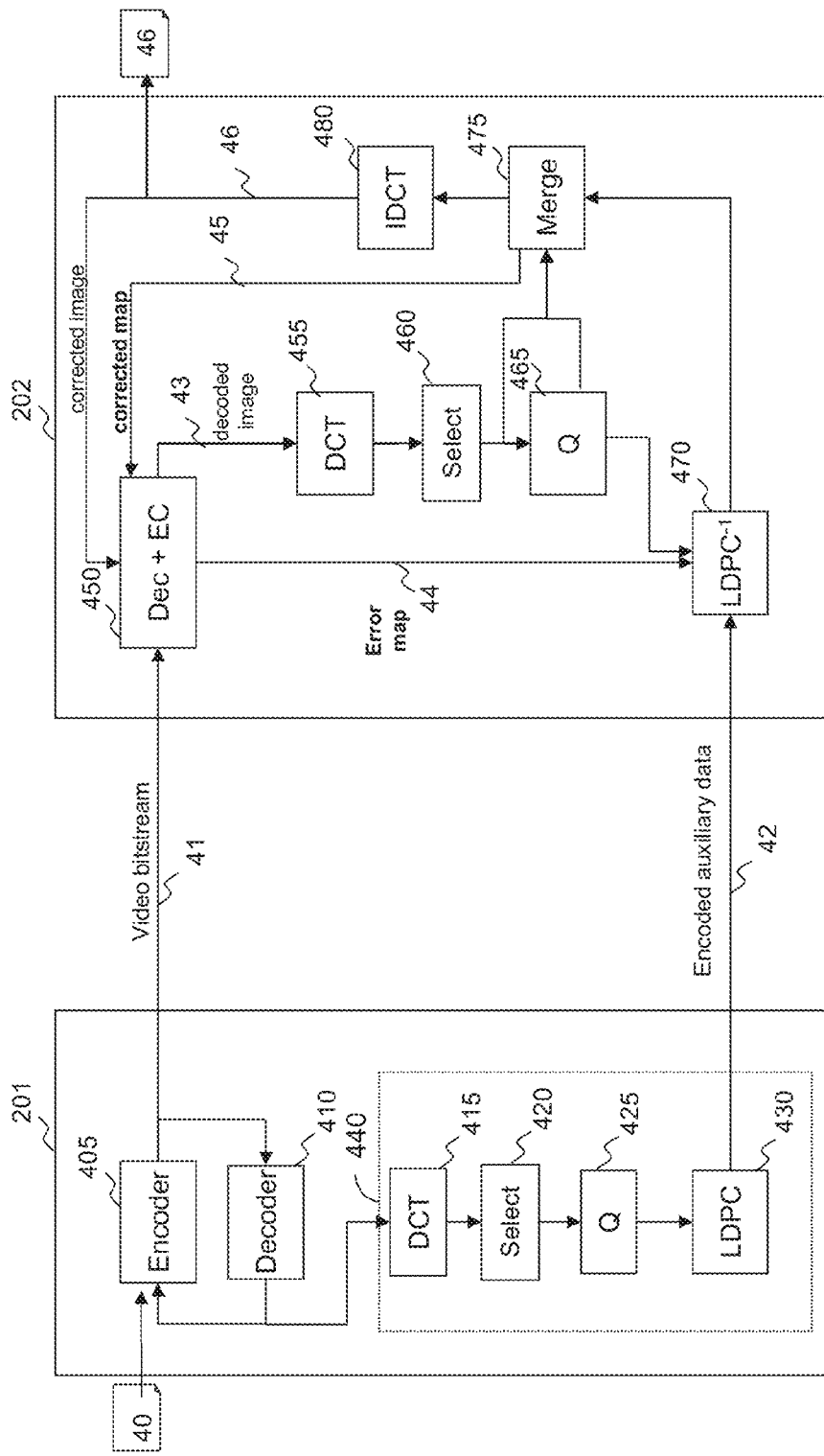
FIG. 4 is a block diagram of a server and a client in an embodiment of the invention.

FIG. 4 illustrates a block diagram of a server and a client in an embodiment of the invention. The processing is represented by connected modules, each module being adapted to implement, for example in the form of programming instructions, a corresponding step of a method implementing an embodiment of the invention.

The server device 201 receives from an external source, such as a camcorder for example, video data 40 to be encoded by an encoder 405. Alternatively, the video data may have been stored in a memory of the server device before processing.

The encoder 405 applies predictive compression using motion compensation according to one of the formats MPEG2, MPEG4 part 2 or H264 and outputs a video bitstream 41. The compressed video bitstream is composed of units that can be decoded independently, called NALU (for Network Abstract Layer Units) in H264 or slices in MPEG4 part 2. In the subsequent description, the units that are encoded and decoded independently are referred to as slices.

The bitstream 41 is transmitted to a client device 202 on the communication network 200. In this example, the bitstream is encapsulated into RTP ("Real-time protocol") transmission packets which are sent via UDP.

The encoder 405 applies predictive type compression. Classically, in video compression standards (MPEG2, MPEG4 part 2, H264) the images of a video sequence can be compressed according to one of the following modes: Intra mode (I), inter prediction mode (P) and bi-directional prediction mode (B).

In the Intra mode, an image is divided into blocks (typically, blocks of 8×8 pixels). A transform is applied on each block, for example a Discrete Cosine Transform (DCT). Next, quantization (Q) is applied. The quantization is a lossy transformation, since the values obtained after de-quantization (or inverse quantization) may be different from the values before quantization. After quantization, a lossless coding such as entropy coding is applied to obtain a bitstream corresponding to an Intra image.

In a prediction mode, an image is also divided into blocks, but each block is encoded with respect to a reference block of a reference image, which has been encoded previously. In the Inter prediction mode (P), only one reference block from one reference image is used. In bi-directional prediction mode (B), a block is encoded with respect to two reference blocks, belonging respectively to two reference images.

The reference blocks are extracted from encoded/decoded reference images, so as to have the same reference blocks at the encoder and at the decoder in case of lossless transmission. In the inter prediction mode (P), the reference image can be the previous image or another image of the video sequence which has already been coded. The reference block is subtracted from the block to code, and then the difference signal (also known as residual signal) is transformed using for example a DCT, then quantized. Finally, an entropy coding is applied to the quantized transformed residuals of a group of predicted blocks which are encoded as a slice.

Further, the motion vector corresponding to each predicted block is also encoded in the bitstream. For example, information identifying the reference image (e.g. its temporal index) and the coordinates of the motion vector are encoded. The coordinates of the motion vector may be non integer (½ or ¼ of pixel).

Both for Intra and Inter modes, if an error occurs during the transmission of a slice, the whole slice is rendered impossible to decode. The number of slices in a video is not imposed by the standards. A low number of slices gives a better compression but a lower error resilience. For example 10 slices could be created in a HD (High Definition) image.

The server 201 also comprises an auxiliary data generation module 440, which is Wyner-Ziv type auxiliary data. This auxiliary data generation module 440 takes as an input the images used as reference images Ir in the video sequence encoding.

Firstly, module 415 applies a transform (such as a DCT transform, similarly to the encoder 405) after a division into blocks of the reference image Ir to obtain first blocks of transform coefficients. For example, for blocks of 8×8 pixels, a set of 64 transform coefficients is obtained.

Next, an optional module 420 selects a subset of the transform coefficients obtained. For example, only a given number of coefficients corresponding to the low frequencies are kept. Classically, the transform coefficients can be ordered as a one-dimensional list of coefficients according to a so-called zig-zag scan, ordering the coefficients in the order of increasing frequencies, associating an index or number to each coefficient. The first N coefficients of the list are selected by the module 420. In a preferred embodiment, N=6, so that coefficients of index i $\{0 \leq i < 6\}$ are selected.

It is advantageous to select a given number of coefficients, in particular the first coefficients corresponding to the lower frequencies, since the visual impact of low frequencies is more important than the visual impact of high frequencies. Auxiliary data selected in this way is therefore more efficient for correcting the error concealment results at the decoder. Moreover, error concealment generally better predicts the low frequencies than the high frequencies. Thus the auxiliary data selected in this way is better suited within the Wyner-Ziv scheme. In other words, for the same correction quality, the auxiliary data can be better compressed.

The coefficients selected by the module 420 are then quantized by the quantizer module 425. The quantization is adapted so that each coefficient is represented by a predetermined number of bits, for example M=4 bits per coefficient. For each coefficient of a given index i, $0 \leq i < 6$, the minimum ($min_i$) and maximum ($max_i$) values are computed considering all blocks of the image, and then a uniform quantization is applied between those minimum and maximum values. In order to obtain a representation on M bits, the interval between the minimum and maximum values is divided into $2^M$ intervals. Each DCT value $C_i$ is replaced by the number of the interval which contains it. The minimum ($min_i$) and maximum ($max_i$) values are quantization parameters, transmitted to the client device 202 with the Wyner-Ziv auxiliary data, also called encoded auxiliary data 42, to ensure that the client device applies the same quantization. Alternatively, another parameter representative of the quantization interval for each coefficient, such as the quantization step, is transmitted to the client device along with the auxiliary data 42.

Next, an error correction code of the symbols representing the quantized coefficients is computed by module 430. In the preferred embodiment, the Low Density Parity Check (LDPC) code is used. In alternative embodiments, other error correction codes known in the art, such as turbo codes, can be applied.

An LDPC code is a linear block code. An error correction code can be characterized by the values (n,k) where n is the number of symbols of a code word and k is the size of the information word. Knowing n and k, it is possible to compute the number of parity symbols m=n−k and the code rate R=k/n. Typically in an LDPC code, the sizes k and m are very large.

In this embodiment, the LDPC code is applied on a subset of transformed and quantized coefficients of the image. For example, if the video is in HD format (High Definition), an image is represented by 1080×1920 pixels. An image is divided into blocks of 8×8 pixels on which a DCT is applied, resulting in 32400 blocks. In this case, k=32400 and using a code rate R of 0.91, we obtain m=3240 parity symbols. The advantage of using a very large size LDPC code adapted to the size of the image (typically, adapted to the number of blocks of the image) is that the spatial locations of the blocks are taken into account. For example, each block of quantized coefficients has an associated code symbol. Typically, the errors are spatially localized since they correspond to slices containing lost image data that has been concealed. A large size LDPC code makes it possible to correct badly concealed areas using the correctly received and decoded image data.

In this embodiment of a Wyner-Ziv type encoder, only the parity symbols (also known as check symbols) are transmitted to the client device 202, as Wyner-Ziv auxiliary data 42. In an embodiment, the encoded auxiliary data 42 is transmitted in a separate RTP stream, different from the RTP stream transporting the video bitstream 41. In an alternative embodiment, it is possible to integrate the encoded auxiliary data 42 within the video bitstream 41, for example using a SEI extension in format H264 (standing for Supplemental Enhancement Information, which is additional non standard metadata defined in H264 format for carrying enhancement information that can be used by a compliant decoder). In this alternative embodiment, a single data stream is transmitted from the server 201 to the client 202, containing both the video bistream 41 and the encoded or Wyner-Ziv auxiliary data 42.

The client device 202 receives the video bitstream 41 and the encoded auxiliary data 42. In practice, the data is received in the form of transmission packets through a network interface 304, and a de-packetizer module (not represented in FIG. 4) extracts the data corresponding to the video packets from the transmission packets and the video packets containing the slice data are concatenated. The video bitstream is then decoded by the decoder module 450.

In the preferred embodiment, the decoder module 450 also integrates an error concealment (EC) algorithm, which is applied when some transmission error is detected. Indeed, in case of bit errors or packet losses, some slices may become impossible to decode. A missing packet can be detected by the de-packetizer module.

The error concealment EC conceals the losses by replacing the lost blocks of pixels (corresponding to the corrupted slice or slices) by blocks of pixels obtained from received data. There are several error concealment methods. In the preferred embodiment, temporal error concealment is used, as explained below with respect to FIG. 5.

However, even after applying an error concealment decoding, the resulting decoded and concealed image 43 is a first decoded image different from the decoded image that would have been obtained if no transmission errors occurred. Some parts of a current image may be badly concealed, due to the motion content of the video. In this case, some visual artifacts appear when the decoded and concealed image is displayed on a screen. Moreover, if the decoded and concealed image is used as a reference image in the predictive scheme, the errors are likely to be propagated to the following decoded images of the video sequence, therefore resulting in other visual artifacts at the display.

In the embodiment of FIG. 4, the encoded auxiliary data 42 is used to correct the first decoded image 43, making it closer to its version at the encoder side. Further, the encoded auxiliary data 42 is also used to limit the propagation of badly corrected errors from the previously decoded and concealed reference images.

The decoding module 450 also outputs an item of information representative of errors which indicates the positions of the pixels whose decoded values are likely to be incorrect. In the preferred embodiment the item of information representative of errors is an error map 44, which will be described in detail hereinafter with respect to FIG. 6.

The first decoded image 43 is transmitted to modules that compute concealment auxiliary data, similarly to the encoder. In particular, module 455 applies a block-based DCT transform to obtain blocks of transform coefficients, similarly to module 415 of the encoder, module 460 applies a selection of a subset of transform coefficients, similarly to module 420 of the encoder and module 465 applies a quantization, similarly to module 425 of the encoder. Note that in order to apply the quantization, module 465 receives as an input the minimum ($min_i$) and maximum ($max_i$) values per coefficient of index i selected obtained from the encoded auxiliary data 42, and the module 465 uses the received values to determine the number of quantization intervals per coefficient. Alternatively, other quantization parameters received by the decoder may be used to determine the same quantization intervals as used during encoding.

The parity symbols received via the encoded auxiliary data 42 are then used by the error correction decoding module 470 to correct the quantized coefficient values obtained from module 465. The error correction decoding module 470 uses the error map 44, as explained in detail hereinafter with respect to FIG. 9.

The error correction decoding module 470, in conjunction with the modules 455 to 465 adapted to extract concealment auxiliary data, implement a step of processing the encoding auxiliary data 42 and the first decoded image 43 based upon the item of information representative of errors. The output of this processing step is corrected auxiliary data. In practice, the error correction decoding provides corrected values of quantized transform coefficients.

The corrected coefficient values are then merged with the selected DCT coefficient values obtained from selection module by the merge module 475 so as to obtain improved transform coefficients and finally, an improved image reconstruction. The non selected DCT coefficient values remain unchanged. Finally, module 480 applies a block-based inverse DCT transform. The resulting decoded image is a second decoded image 46, which is a corrected concealed image 46. The resulting image 46 may be output to an application (for example displayed), and also stored to be subsequently used as a reference image by the decoder module 450.

Optionally, the merge module 475 can also correct the error map 44 to provide a corrected error map 45 to the decoder. The decoder module 450 then uses the input corrected error map 45 to compute the error maps for the following images using the current image as a reference image.

Figure 5:
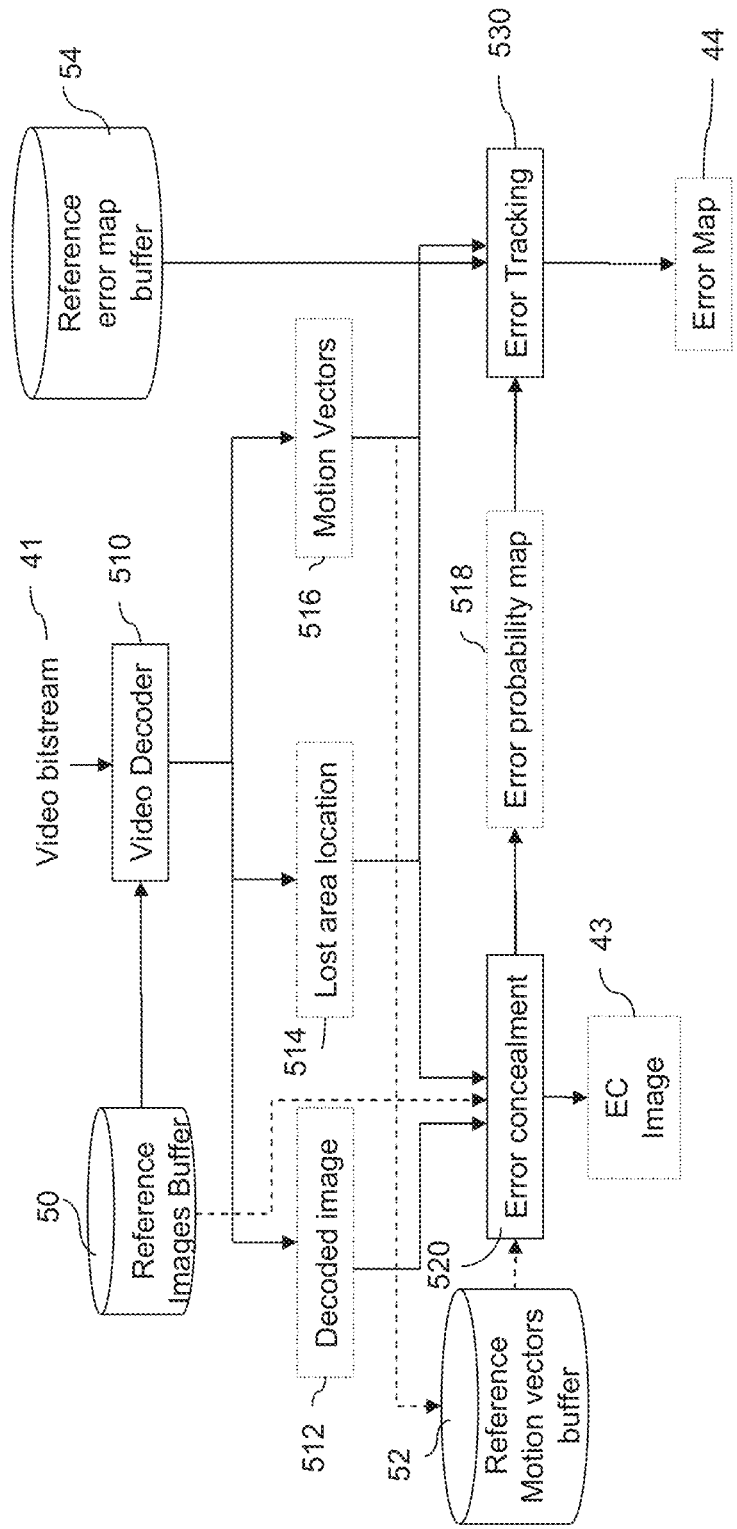
FIG. 5 is a block diagram of a video decoding and error concealment module embodying the invention.

FIG. 5 is a block diagram showing one example constitution of the video decoding and error concealment module 450 of FIG. 4. The processing carried out by the decoding and error concealment module is represented by connected modules, each module being adapted to implement, for example in the form of programming instructions, a corresponding step of a method of decoding and error concealment according to an embodiment of the invention.

The slices constituting the video bitstream 41 are received and input to a video decoder module 510. In case of missing transmission packets, the slices containing those packets have been marked as incorrect by the de-packetizer, as explained with respect to FIG. 4.

The video decoder module 510 generates a current decoded image 512 by decoding all the slices of the current image which have been correctly received. When the current image has been coded using Inter prediction, the video decoder 510 uses the previously decoded images as reference images, which are stored in a reference images buffer 50.

The video decoder 510 also extracts the motion vectors 516 corresponding to the current image. The motion vectors 516 are stored in a reference motion vectors buffer 52, so that they can be used for the error concealment of a following image of the video sequence.

The video decoder module 510 detects if one or several slices of the current image have been marked as incorrect (either a packet has not been received or a bit error has been detected in the bitstream). In case of positive detection, all the blocks constituting the slices are considered as being incorrect and their position is memorized in a lost area location structure 514. In the preferred embodiment, the lost area location structure is a lost area location map, of the same size as the current image, signaling the incorrect blocks by a specific pixel value. For example, the pixels at positions corresponding to the incorrect blocks take the value zero whereas the other pixels take the value one.

The positions of the incorrect blocks are used by the error concealment module 520. This error concealment module 520 fills in the decoded image 512 the areas corresponding to the incorrect blocks with predicted pixel values. Depending on the error concealment algorithm used, the error concealment module 520 may need to use previously decoded reference images stored in the references images buffer 50 and their associated motion vectors stored in the reference motion vectors buffer 52. An example of such error concealment algorithm will be given with respect to FIG. 7.

The result of the processing by the error concealment module 520 is a first decoded and concealed current image 43.

In this embodiment, the error concealment module 520 also generates an error probability map 518, which indicates a reconstruction evaluation or reconstruction confidence of the result of the error concealment algorithm. Indeed, some incorrect blocks may be better concealed than others, based on the contents of the video sequence. The generation of the error probability map 518 for a particular error concealment algorithm will be explained hereafter with respect to FIG. 7.

The error probability map 518 is used by the error tracking module 530, which is applied for generating or updating the item of information representative of the errors in the current frame, which is the error map 44 corresponding to the current decoded image 43 in the preferred embodiment.

If the current decoded image 43 has been coded in Intra mode, then it does not depend temporally on previous images. In this case, the error tracking module 530 simply generates an error map 44 for the current image, based on the error probability map 518.

In a simplified embodiment, the error concealment module simply generates an error probability map 518 which is a subset of the lost area locations 514, indicating simply which pixels of the lost area have been successfully concealed.

In the case the current decoded image 43 has been coded in Inter mode (P or B), the error tracking module 530 applies an updating of an error map extracted from a reference error map buffer 54, corresponding to a previous reference image. The updating takes into account the error probability map 518 generated by the error concealment module 520, based on the lost area location map 514. In an embodiment described in detail hereafter with respect to FIG. 6, the motion vectors 516 of the current decoded frame 43 are also used by the error tracking module 530.

Figure 6:
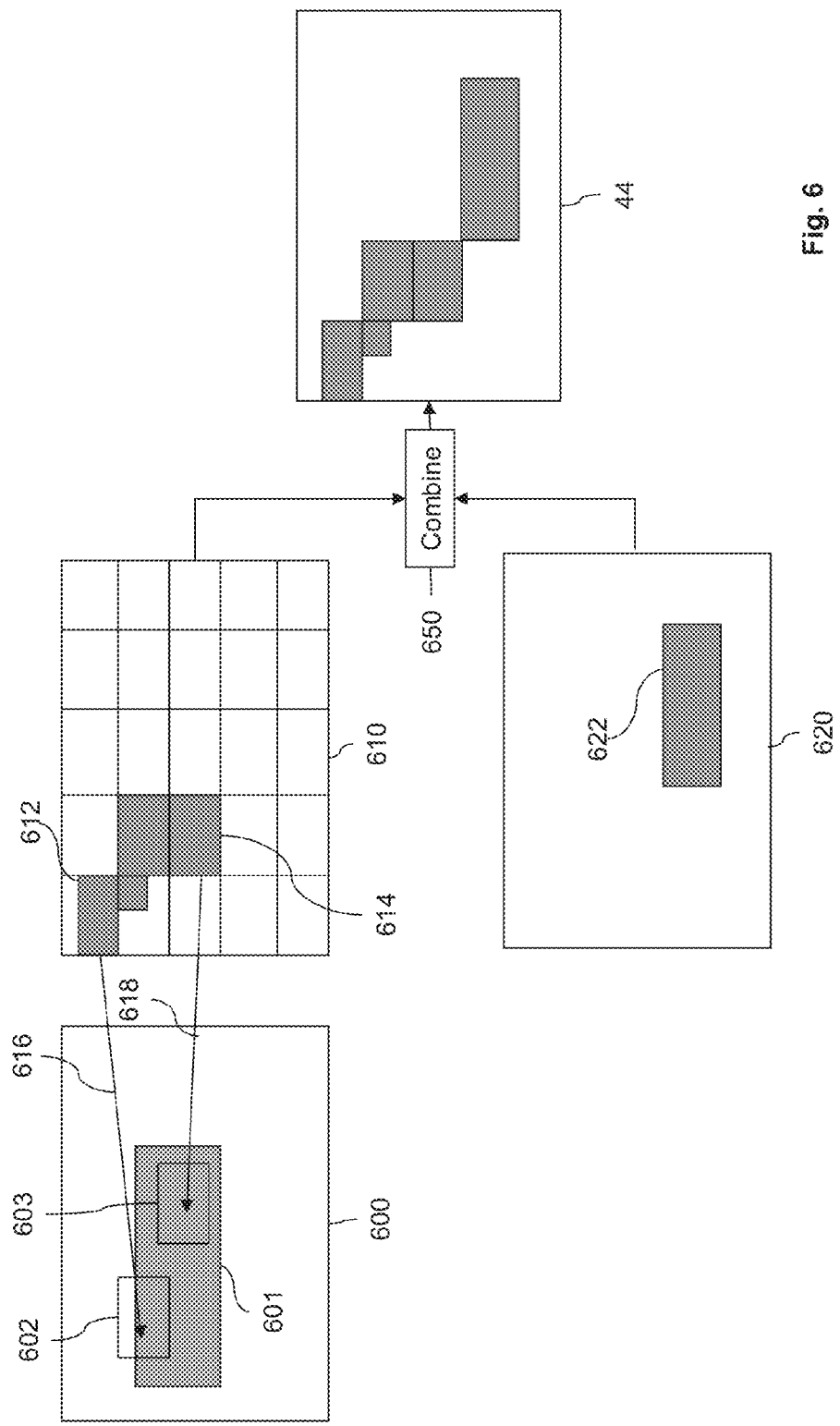
FIG. 6 is an illustration of the error probability tracking.

FIG. 6 illustrates in more detail the error probability tracking in the case of a current decoded image I(t) of predicted type (P or B image).

The error map ELMt' 600 at time index t', prior to the time index t of the current image I(t), is graphically represented in FIG. 6 as an image of the same size as an image of the video sequence. In a preferred embodiment, t'=t−1.

The gray area 601 represents the area of accumulated errors between the last Intra encoded image and the decoded image at time t', I(t').

In the preferred embodiment, the values of the pixels of the error map $ELM_{t'}$ 600 are real values representing a reconstruction confidence of the corresponding decoded and concealed pixel value, for example the probability that the value of the corresponding pixel of the corresponding decoded image I(t') is correct:

$$ELM_{t'}(x, y) = \begin{cases} P_{x,y} < 1 & \text{Gray\_area} \\ 1 & \text{White\_area} \end{cases} \quad (1)$$

In a simple embodiment, when $P_{x,y}=0$ the corresponding pixel is considered as erroneous.

In an alternative embodiment, every $P_{x,y}$ can take a real value such as: $0 \leq P_{x,y} \leq 1$, as explained hereinafter with respect to FIG. 7.

The error map $ELM_{t'}$ 600 at time t' is propagated to an error map $ELM_t$ 610 at current time t, also shown in FIG. 6. Since the current image I(t) is of predicted type, each block of the current image has an associated motion vector pointing to a reference image. The motion vectors are extracted from the encoded representation of the current image I(t) by module 510 of FIG. 5.

The same motion vectors are used for the propagation or tracking of the error map.

Two blocks predicted from previous image I(t') are represented in FIG. 6: block 612 and its associated motion vector 616, which points to block 602 of error map $ELM_{t'}$ 600 and block 614 with its associated motion vector 618 which points to block 603 of error map $ELM_{t'}$ 600. The values of the error map $ELM_{t'}$ 600 are copied into the error map $ELM_t$ 610, according to the motion vector of each corresponding block.

In the example of FIG. 6, all values of block 602 are copied to block 612 and all values of block 603 are copied to block 614. Since the errors are quite localized, in one embodiment the error map $ELM_t$ 610 at time t is initialized with all its pixels equal to 1, and only the blocks of the error map $ELM_{t'}$ 600 which contain values less than 1 are copied into $ELM_t$ 610 according to the corresponding motion vector.

In case of non integer motion compensation (half pixel or quarter of pixel coordinates for a motion vector), the probability of correct reconstruction of a pixel can be computed as the mean of the neighborhood probabilities.

In FIG. 6, the image 620 is a schematic representation of the error probability map of the current decoded image I(t). The gray area 622 represents the lost area location of the current image I(t), whereas the rest of image 620 (white area) represents the parts that have been decoded without error. Each pixel of area 622 has a probability of correct reconstruction lower than or equal to one, provided by the error concealment module 520.

The propagated error map $ELM_t$ 610 and the error probability map of the current decoded image 620 are combined by a combine module 650 to obtain the error map 44 corresponding to the current image I(t).

In the preferred embodiment, the combination is advantageously carried out by a simple pixel by pixel multiplication, which is very simple in terms of computation.

Alternatively, for each pixel location, the lowest value between the values of 610 and 620 may be kept by the combine module 650.

The error map 44 is stored in the reference error map buffer 54. In an alternative embodiment, the error map 44 is further modified by the merge module 475 before being stored in the reference error map buffer 54. Such a modification of the error map will be explained in more detail with respect to FIG. 10.

Figure 7:
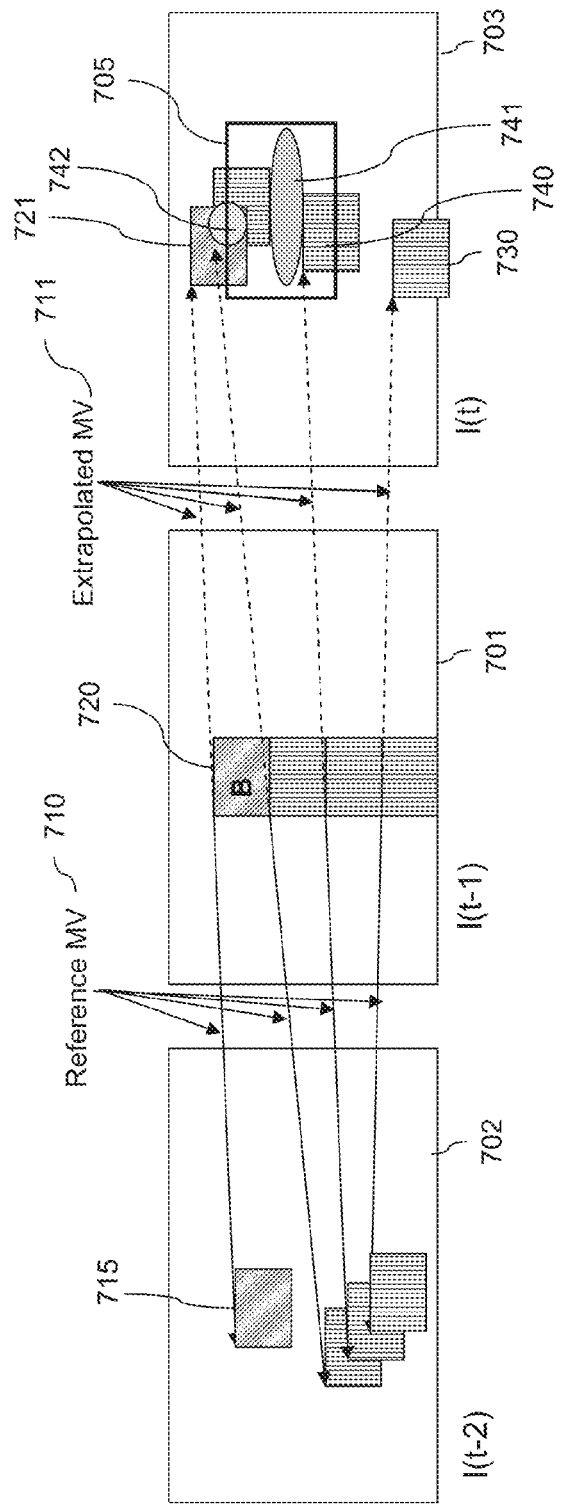
FIG. 7 is an illustration of motion extrapolation error concealment.

FIG. 7 illustrates the motion extrapolation error concealment method, which is an efficient error concealment method for a sequence of images encoded according to a predictive format. This error concealment method is applied in the preferred embodiment in the case where the current decoded image is either in Intra or in predicted mode, and is preceded by an image I(t−1) which is in predicted mode.

In FIG. 7, image I(t) 703 represents the current image which contains an area 705 for which the data was lost or incorrect. The area 705 typically corresponds to a slice composed of a plurality of blocks not represented on the figure. The current image I(t) 703 is preceded by the image I(t−1) 701 in the example of FIG. 7. The image I(t−1) 701 is a predicted image, which has been predicted with respect to its reference image I(t−2) 702.

Typically, the reference images I(t−1) 701 and I(t−2) 702 can be obtained from the reference images buffer 50. A few blocks 720 of the reference image I(t−1) 701 have been represented, for illustration purposes. Each block 720 has an associated reference motion vector 710 pointing to a previous reference block 715 of image I(t−2) 702. The reference motion vectors 710 can be obtained from the reference motion vectors buffer 52.

If we denote as $V(v_x,v_y)$ the motion vector (710) of a block B 720 in image I(t−1) 701, the extrapolated vector is $\hat{V}(-v_x,-v_y)$ (711). The change of sign indicates the change of direction from past to future.

Each extrapolated motion vector can be used to project the pixel values of the decoded and possibly concealed image I(t−1) 701 to the current image I(t) 703. For example, block 721 of image I(t) 703 is obtained by copying the values of block 720 of image I(t−1) 701 as indicated by the corresponding extrapolated motion vector 711.

In case of non integer motion vector (½ or ¼ pixel motion vector) the target value can be interpolated from the neighborhood projected values.

The motion extrapolation error concealment is applied only to replace the pixel values within the lost area 705. For example, block 730 obtained by motion extrapolation from image I(t−1) 701 is not copied in the decoded and concealed image I(t) 703.

As shown in FIG. 7, some overlap of blocks projected by motion extrapolation may occur inside the area 705 to be concealed. As schematically represented, some pixels of image I(t) 703 have only one associated projected value by motion extrapolation (area 740 of image I(t) 703), others have zero projected value (area 741 schematically represented in FIG. 7) and others have two or more associated projected values (area 742 schematically represented in FIG. 7, with two corresponding projected values). This is caused by the different motions in different areas of the video sequence. We will term covered areas the areas, such as area 742, for which several pixels are projected by motion extrapolation and uncovered areas, the areas such as area 741, for which no pixel value is projected by motion extrapolation. The motion extrapolation is not efficient both for covered and uncovered areas, which are likely to be badly concealed.

There are several methods known in the art to complete an area to be concealed, even in the case of covered and uncovered areas such as areas 741 and 742. For example for a covered area 742, the extrapolation algorithm can select randomly one of the projected pixel values. For an uncovered area 741 a classical solution consists in a spatial interpolation with the closest pixel values obtained by projection.

The motion extrapolation method also provides an information on the quality of error concealment, which can be used to obtain the error probability map 518 associated with the current frame.

It is considered that for areas such as the area 740 with a single projected value, the probability of error is quite low, and therefore the probability of correct reconstruction is quite close to 1, whereas in the covered and uncovered areas, the probability of error is quite high, resulting in a probability of correct reconstruction close to 0.

In a typical embodiment, the number of times a pixel from the reference image I(t−1) 701 is projected onto a pixel in the area to be concealed 705 of the current image 703 is kept in memory. If the number of projected pixels is equal to one, the corresponding value in the error probability map is set to 0.9; whereas if the number of projected pixels is different from one, the corresponding value in the error probability map is set to 0.1.

Alternatively, if the number of projected pixels is equal to one, the corresponding value in the error probability map is set to 1; if the number of projected pixels is equal to Nb>1, the corresponding value of probability in the error map is set to 1/Nb; finally, if the number of projected pixels is equal to zero, then the corresponding value in the error probability map is set to 0.1.

FIG. 7 describes the motion extrapolation temporal error concealment but other error concealment methods could be used: for example motion interpolation error concealment. In such a method the motion vectors for the missing parts of the image are interpolated from the motion vectors received in the other parts of the same image.

In such a method, the reconstruction confidence of the error concealment can be evaluated for each block by using for example a gradient based boundary matching such as described in "S; Belfiore, M. Grangetto, E. Magli, G. Olmo, "Spatio-temporal Video Error Concealment with Perceptually Optimized Mode Selection", ICASSP 2003—IEEE International Conference on Acoustics, Speech, and Signal Processing, Hong Kong, April 2003". This method allows measuring the edge discontinuity between the block and its neighboring blocks to evaluate the error concealment quality for the block and thus can be used to set the reconstruction confidence for all pixels in the block in the error probability map 518.

In some cases the temporal error concealment gives an incorrect prediction, as for example in presence of a scene cut. This can be detected if the reconstruction confidence evaluated previously is very bad. Thus in these cases, a spatial motion interpolation should be selected: the values of the pixels are interpolated from the values of the neighboring pixels. But the spatial error concealment quality is in general poor and accordingly the reconstruction confidence in the error probability map 518 should be set a low value.

An example of application of an LDPC error correction code in the error correction coding module 430 and the error correction decoding module 470 is described with respect to FIGS. 8a to 8e. FIGS. 8b to 8e are described later with reference to FIG. 9.

Figure 8B:
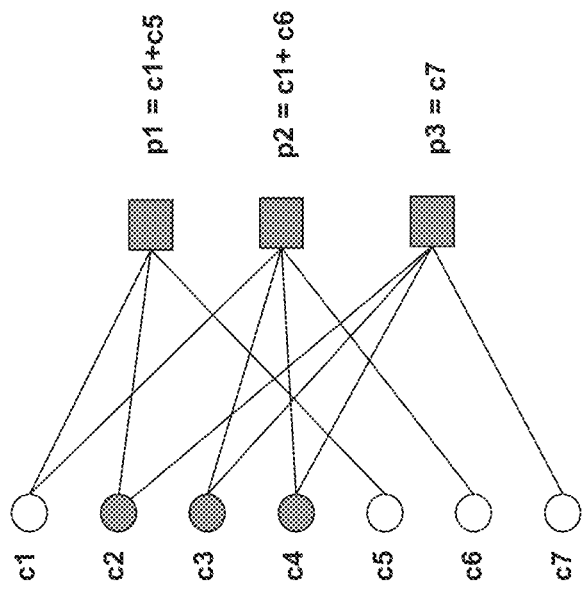
Figure 8A:
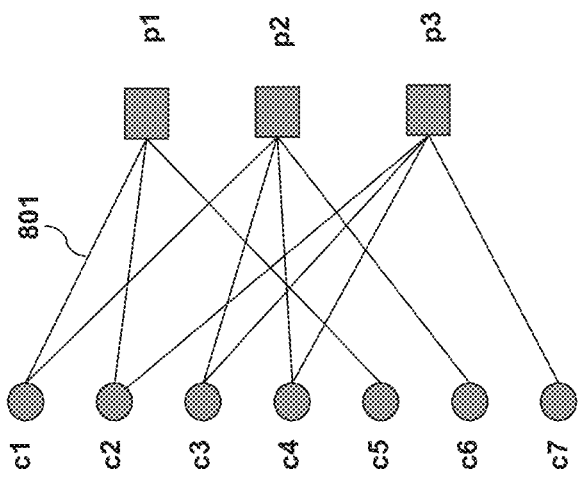

FIG. 8a represents graphically a parity matrix H, also known as LDPC matrix, of a very simple linear code of size (7,4), illustrated for the ease of explanation.

For example the matrix equivalent to FIG. 8a is $$H = \begin{bmatrix} 1 & 1 & 0 & 0 & 1 & 0 & 0 \\ 1 & 0 & 1 & 1 & 0 & 1 & 0 \\ 0 & 1 & 1 & 1 & 0 & 0 & 1 \end{bmatrix},$$

which is a Boolean matrix.

In an LDPC code the matrix H is a large sparse Boolean matrix.

Given a word $\underline{c}=[c_1, c_2, c_3, c_4, c_5, c_6, c_7]$ composed of 7 symbols, it can be checked that the word is a code word by verifying that:

$$H\underline{c}^{(T)} = \begin{bmatrix} 0 \\ 0 \\ 0 \end{bmatrix} \quad (2)$$

Where $\underline{c}^T$ is transposed from vector $\underline{c}$.

It should be noted that the arithmetical operations are carried out as follows. The addition is the binary XOR operation and the multiplication is the binary AND operation. Note that addition and subtraction are the same operation and the inverse of a symbol is the symbol itself.

The matrix H is equivalent to the graph represented FIG. 8a: the symbols of word c are at the left of the graph and the check nodes p which must be null are at the right. The symbols checked by each check node are linked to the check node. The links 801 between the symbols $c_i$ and the nodes $p_i$ of FIG. 8a represent the lines of parity matrix H.

For example, when applying the parity check (2) with the first line of matrix H, the following relationship is obtained:

$$p_1 = c_1 + c_2 + c_5 = 0$$

When H has the form $[-R^{T/}{}_{n-k}]$. i.e. the last n–k columns of H are equal to the identity matrix of size n–k denoted $I_{n-k}$, it is easy to compute the generating matrix $G=[I_k|R]$, where G is composed of the identity matrix of size k, $I_k$, and the transpose of the inverse of the first part of H, denoted R, of k lines and n–k columns. Given an information word $\underline{u}=[u_1, u_2, u_3, u_4]$, then $\underline{u} \cdot G = \underline{c}$.

The code is systematic: the first k values of the code word c ($c_1, c_2, c_3, c_4$) are equal to the information word u composed of k information symbols. The last (n–k) values of c are the parity symbols which are transmitted as encoded auxiliary data 42.

In the preferred embodiment, at the encoding, each block of quantized coefficients is associated to an information symbol $u_i$. Each code symbol is represented on as many bits as necessary to represent the N coefficients selected per block, typically N×M bits. For example, in FIG. 8a, the information word represents an image of four blocks, each information symbols $u_i$ being associated to one block.

In a regular LDPC code, the sparse matrix R is selected with the constraints that in each column the number of bits equal to 1 is fixed to a small value, typically 3, so that each symbol is used for 3 checks.

In an alternative embodiment, an irregular LDPC matrix such as a Tornado code can be used, as described in Michael G. Luby, Michael Mitzenmacher, M. Amin Shokrollahi, Daniel A. Spielman, Volker Stemann, "Practical loss-resilient codes", *Proceedings of the twenty-ninth annual ACM symposium on Theory of computing*, p. 150-159, May 04-06, 1997, El Paso, Tex., United States.

In the current embodiment, the matrix R is created and made available to the modules 430 and 470 before the video transmission. The matrix R depends on the number of blocks per image since in this embodiment, an information symbol is obtained from all quantized coefficients selected for a block.

In an alternative embodiment, it is possible to transmit from the server 201 to the client 202, along with the auxiliary data, either the matrix R or some parameters allowing module 470 to generate exactly the same matrix R as used by module 430.

The encoding module 430, thus applies a multiplication by R to the quantized data provided by module 425. In this operation, since an information symbol is formed by the selected quantized coefficients of a DCT block, all operations (XOR and AND) are thus applied per block and consequently, the encoding is very fast.

Figure 9:
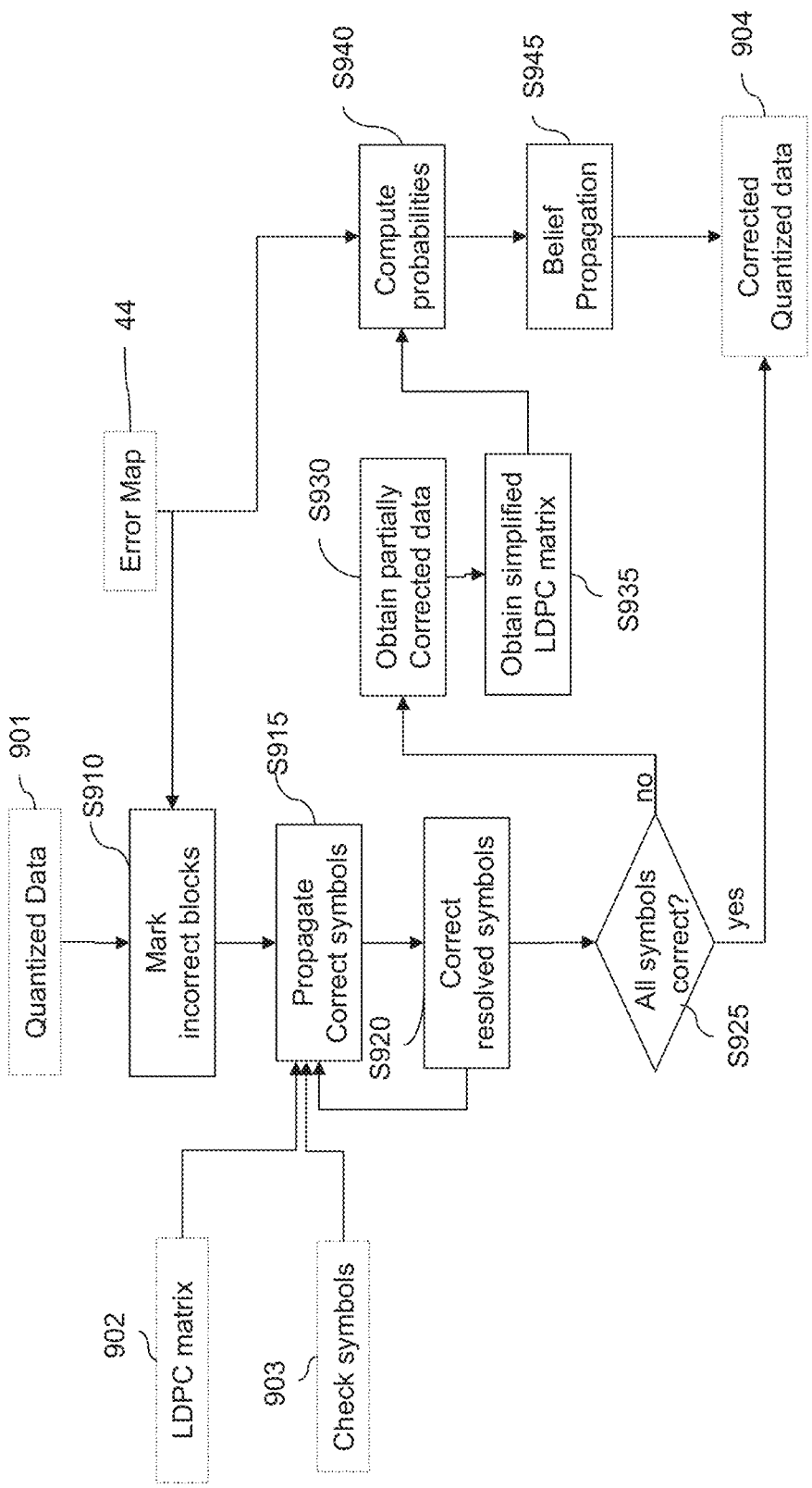
FIG. 9 is a flowchart of an embodiment of a decoding method according to the invention.

FIG. 9 is a flowchart of an embodiment of an error correction decoding method implemented by the error correction decoding module 470. All the steps of the algorithm represented in FIG. 9 can be implemented in software and executed by the central processing unit 301 of the device 202.

The error correction decoding algorithm is divided into two phases: a first phase of erasure decoding, applied at block level and a second phase based on probabilities of error per bit.

The quantized DCT coefficients 901 produced by quantizer module 465 from the first decoded image 43 obtained by decoding and error concealment are used as an input for the error correction decoding. The error map 44 which takes into account the error concealment of the pixels situated in the lost areas and the propagation of errors from previous images, as explained with reference to FIG. 6, is also an input to the error correction decoding algorithm.

The error map 44 indicates the pixels of the current image which may contain error due to the result of the error concealment and due to the predictive coding.

The blocks containing one or more incorrect pixels according to the error map, that is to say one or more pixels with an associated value lower than 1 in the error map, are marked as incorrect at marking step S910. Consequently, the corresponding symbols are considered as incorrect.

The parity symbols 903, extracted from the encoded auxiliary data 42 received and the correct blocks determined at step S5910 are used at propagation step S5915 to propagate the correct other symbols and to simplify the LDPC matrix 902.

Each correct symbol (corresponding to a correct block, i.e. a block that has not been marked as incorrect at step S5910) and parity symbol is added to the associated check values and the associated column in the matrix H is set to 0 and thus can be removed. For example in FIG. 8*b*, if the symbols $c_1$, $c_5$, $c_6$ and $c_7$ are correct, the values $p_1$, $p_2$ and $p_3$ take respectively the values $c_5+c_1$, $c_6+c_1$ and $c_7$.

The resulting simplified LDPC parity matrix is:

$$H_1 = \begin{bmatrix} 1 & 0 & 0 \\ 0 & 1 & 1 \\ 1 & 1 & 1 \end{bmatrix}$$

which is represented in FIG. 8*c*.

Next, the symbols that can be corrected, also called resolved symbols, are corrected at step S5920. Typically, if one check has only one incorrect symbol, then the incorrect symbol can be replaced by the value of the associated check.

For example in FIG. 8*d*, because the check symbol $p_1$ is connected only to symbol $c_2$, it can be used to correct the value $c_2$: $c_2 = p_1 = c_1 + c_5$ The LPDC matrix is simultaneously simplified: the line of the correct check node can be removed in the matrix $H_1$. We obtain the matrix $$H_2 = \begin{bmatrix} 0 & 1 & 1 \\ 1 & 1 & 1 \end{bmatrix}$$

represented in FIG. 8*d*.

The algorithm returns then to step S5915 of propagation of correct symbols. In this example, the value $c_2$ is propagated and the LDPC matrix is further simplified.

Finally, the matrix $$H_3 = \begin{bmatrix} 1 & 1 \\ 1 & 1 \end{bmatrix}$$

represented in FIG. 8*e* is obtained.

The first decoding phase stops when all symbols are correct or when no more correct symbols can be removed and the check equations or check node are associated to more than 1 incorrect symbol which is the case of FIG. 8*e*.

At step S5925 it is checked whether all symbols are correct. In case of positive answer, the error correction decoding is finalized and the corrected quantized data 904 is output.

In case of negative answer, the algorithm continues with the second phase, which proceeds bit by bit based on the probabilities of error per bit.

Thus the computation cost of the second phase may be more important than the computation cost of the first decoding phase, which proceeded with symbols of large size corresponding to a quantized DCT block. However, because the data has been partially corrected and the LDPC parity matrix has been simplified in the first error correction decoding phase, the computation cost remains not too expensive for a video decoder.

The partially corrected data ouput by the first error correction decoding phase is obtained at step S5930 and the corresponding simplified LDPC matrix is obtained at step S5935.

Then at step S5940 the probabilities per bit are computed, expressed as a probability ratio which is called the likelihood: for each bit, the probability of its value being 1 divided by the probability of its value being 0. As the algorithm progresses, these probability ratios will be modified to take account of information obtained from other bits, in conjunction with the requirement that the parity checks be satisfied.

The error map 44 is used to compute a mean value of probability of correctness per block. For example, for a given block B, $$p_B = \frac{\sum_{(i,j) \in B} ELM(i,j)}{n_B},$$

where $n_B$ is the number of pixels per block and $ELM(i,j)$ is the value of the error map (44) at pixel situated at $(i,j)$ coordinates.

Finally, the value $p_B$ is used as the initial probability of correctness for each bit $b_B$ of a symbol belonging to block B. If $p_B$ is close to 1, then the probability of the bit to be correct is high. If $p_B$ is close to 0, then the bit will have a probability of 0.5 to be either 0 or 1. Finally, the likelihood (or probability ratio) associated to a bit $b_B$ is the following:

if $b_B = 1$, $$\text{likelihood}(b_B) = \frac{(1+p_B)}{(1-p_B)}$$

if $b_B = 0$, $$\text{likelihood}(b_B) = \frac{(1-p_B)}{(1+p_B)}$$

In both cases, if $p_B$ is close to 0, the likelihood is equal to 1, that is to say there is an equal probability for the bit $b_B$ to have value 1 or value 0.

Next, a Belief Propagation algorithm, as described in the article "Good error-correcting codes based on very sparse matrices", by D. J. C. MacKay, published in *IEEE Transactions on Information Theory* 1999, vol. 45, pp. 399-431, is applied at step S5945.

The algorithm is applied by bitplanes, once for each bitplane of the quantized blocks using the simplified matrix obtained at step S5935. Hence, in this second decoding phase, an information symbol used in the parity check of the decoding is one bit of a block of quantized coefficients.

For each parity check, the algorithm computes a probability ratio for every bit that participates in that parity check. These ratios give the probability of that parity check being satisfied if the bit in question is 1 divided by the probability of the check being satisfied if the bit is 0, taking account of the probabilities of each of the other bits participating in this check, as derived from the probability ratios for these bits with respect to this check.

For every symbol bit, the algorithm computes a probability ratio for each parity check in which said bit symbol is involved, giving the probability for that bit to be 1 versus 0 based only on information derived from other parity checks, along with the data received for the bit.

The algorithm alternates between recalculating the probability ratios for each check and recalculating the probability ratios for each bit.

The algorithm stops if all checks are verified, in which case the correction has succeeded or after a predefined number of iterations, in which case the correction has failed. If the algorithm has failed, the corrected data 904 is equal to the partially corrected data obtained at step S5930, after the first error correction decoding phase.

If the algorithm has succeeded, the corrected auxiliary data 904 is completely corrected, i.e. it does not comprise any erroneous bit.

In an alternative embodiment, the second decoding phase can be applied directly, without going through the first decoding phase. However, such an error correction decoding would be less efficient in terms of computation time, since the first phase simplifies a lot the data to be processed bit by bit during the second phase.

Figure 10:
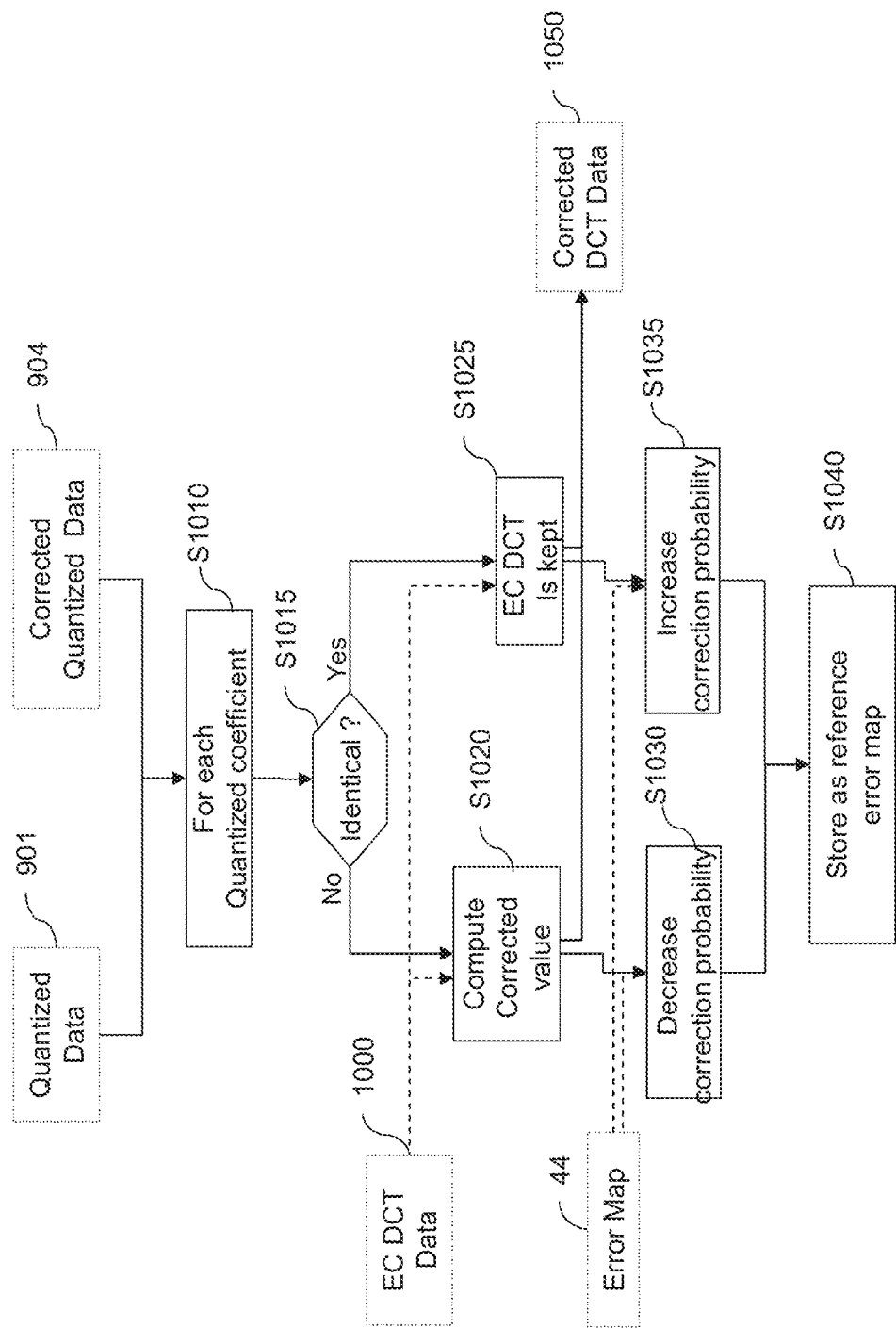
FIG. 10 is a flowchart illustrating an embodiment of the image improvement step according to the invention.

FIG. 10 is a flowchart illustrating an embodiment of the image improvement step according to the invention, implemented by the merge module 475 of FIG. 4. All the steps of the algorithm represented in FIG. 10 can be implemented in software and executed by the central processing unit 301 of the device 202.

The purpose of the image improvement step is to correct some of the DCT coefficient values 1000, obtained from the error concealment algorithm after the select module 460, using the quantized DCT coefficients 901 input to the error correction decoding module 470 and the corrected quantized coefficients 904 output by the error correction decoding module 470. Finally, the first decoded image is modified based on the encoded auxiliary data 42 to obtain a second decoded image, which is of better visual quality than the first decoded image.

Each DCT coefficient having a corresponding quantized coefficient and located in an area for which the corresponding value in the error map 44 indicates a potential error is processed (step S1010).

At a comparison step S1015, the quantized value of the given coefficient (extracted from the quantized data 901) is compared to the corrected quantized value of the given coefficient (extracted from the corrected quantized data 904). If the values are identical, then the corresponding DCT coefficient value before quantization is kept as a correct DCT coefficient value. Indeed, if the quantized value of the coefficient is equal to the corrected quantized value, then it can be deduced that the value provided by the error concealment is close to the correct coefficient value.

In practice, at step S1025, the value of the DCT coefficient is memorized in the corrected DCT data 1050 which is the output of the merge module 475.

As explained earlier, it is also possible to update the error map during the merge step.

Step S1025 is followed by optional step S1035 at which the probability of correct reconstruction of the block containing the current DCT coefficient is increased in the error map.

In a preferred embodiment we can multiply the probabilities of all the pixels in the block by a weighting coefficient a:

$$ELM'(i,j) = ELM(i,j)(1-a) + a$$

where $ELM(i,j)$ is the value of the error map (44) at pixel situated at (i,j) coordinates and $ELM'(i,j)$ is the value of the updated or corrected error map (45) at pixel situated at (i,j) coordinates.

The weighting coefficient a may depend of the index of the DCT coefficient and the number N of selected DCT coefficients by the modules 420 and 460. For example, if N is equal to 6, we can select a=0.1 for the first DCT coefficient (also known as DC coefficient) and a=0.05 for all the other coefficients.

If at comparison step S1015 the values are different, then it can be deduced that the DCT coefficient value provided by the error concealment (extracted from the EC DCT data 1000) is incorrect. Step S1015 is then followed by step S1020 at which a corrected non quantized DCT value is computed from the corrected quantized value.

As already explained, a quantized value corresponds to an interval of non quantized values $[V_a, V_b]$. In this embodiment, from a given corrected quantized value v, the non quantized value $V = (V_a + V_b)/2$ is taken, which is the value that corresponds to the middle of the quantization interval to which the corrected quantized value v belongs. Alternatively, other choices among the values of the quantization interval may be taken.

The value V computed replaces the corresponding DCT coefficient value in the corrected DCT data 1050.

Optionally, step S51020 is followed by step S1030 at which the probability of correct reconstruction of the block containing the current DCT coefficient is decreased in the error map.

In a preferred embodiment we can multiply the probabilities of all the pixels in the block by a weighting coefficient b:

$$ELM'(i,j) = ELM(i,j)(1-b)$$

where $ELM(i,j)$ is the value of the error map (44) at pixel situated at (i,j) coordinates and $ELM'(i,j)$ is the value of the updated or corrected error map (45) at pixel situated at (i,j) coordinates.

The weighting coefficient b may depend of the index of the DCT coefficient and the number N of selected coefficients. For example if N is equal to 6, we can select b=0.1 for the first DCT (also known as DC coefficient) coefficient and b=0.05 for all the other coefficients.

Finally, after all the quantized coefficients corresponding to all the blocks of the area which has undergone an error concealment have been processed, the updated error map is stored in the reference error map buffer 54 at step S51040.

Also, the corrected DCT coefficients 1050 can be provided to the inverse DCT module 480 to apply an inverse DCT per block and to obtain a second decoded image 46, which is corrected with respect to the first decoded image 43. The corrected image 46 is then supplied to the decoder module 450 to be stored in the reference image buffer 50 in order to be used for decoding the following images either during the decoding 510 of predicted images or in the error concealment 520.

The embodiments of the invention described above use a block-based DCT transform. However, other alternative transformations, applied on a spatial subdivision of an image such as a block, can be applied. In particular, an Hadamard transform or a transform based on oriented filters can be applied alternatively.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of United Kingdom Patent Application No. 1001477.7, filed Jan. 29, 2010, which is hereby incorporated by reference herein in its entirety.

What is claimed is:

1. Method of decoding a sequence of digital images encoded according to a predictive format, using encoded auxiliary data, the encoded auxiliary data being representative of at least part of said sequence of digital images, the method comprising:
decoding a current encoded image received with at least one detected error, including applying an error concealment decoding on at least part of the current encoded image containing such a detected error to obtain a first decoded image,
obtaining an item of information representative of reconstruction errors based upon a reconstruction confidence of the error concealment decoding for at least one pixel of the part of the current encoded image,
processing the encoded auxiliary data and the first decoded image based upon the item of information representative of reconstruction errors to obtain corrected auxiliary data, and
modifying the first decoded image to obtain a second decoded image based upon the corrected auxiliary data,
wherein the item of information representative of errors is an error map including non-integer values associated with the first decoded image, comprising, for each pixel of the first decoded image, a real value $P_{x,y}$ representative of a probability of correct reconstruction associated to the decoded value of the pixel, such that: $0 \leq P_{x,y} \leq 1$,
wherein the current encoded image is encoded predictively with respect to a reference image according to a set of associated motion vectors, and wherein the step of obtaining of an item of information representative of reconstruction errors include obtaining a reference error map corresponding to the reference image, and propagating the reference error map according to the set of motion vectors to obtain a propagated error map,
wherein the obtaining of an item of information representative of reconstruction errors further comprises combining the propagated error map with an error probability map comprising, for each pixel reconstructed by error concealment decoding, a value representative of a probability of correct reconstruction associated with the pixel.

2. A method according to claim 1, a predictive format comprising motion compensation, wherein the error concealment decoding is a motion extrapolation decoding, and wherein the reconstruction confidence of the error concealment is based, for a given pixel, upon a number of values obtained by motion extrapolation to conceal the value of the pixel.

3. A method according to claim 1, wherein the obtaining of an item of information representative of reconstruction errors is further based upon positions of errors detected in at least one image decoded previously.

4. A method according to claim 1, wherein the encoded auxiliary data received for the current encoded image comprises a set of parity symbols obtained at the encoder by applying an error correction encoding to auxiliary data extracted from a current image corresponding to the current encoded image in the sequence of digital images.

5. A method according to claim 4, wherein the processing of the encoded auxiliary data comprises extracting concealment auxiliary data from the first decoded image.

6. A method according to claim 5, wherein the extracting of concealment auxiliary data comprises:
dividing the first decoded image into blocks of decoded pixels, and
applying a transform on each block of decoded pixels to obtain a block of transform coefficients.

7. A method according to claim 6, wherein the extracting of concealment auxiliary data from the first decoded image further comprises:
selecting a subset of transform coefficients of each block of transform coefficients, and
quantizing each selected transform coefficient on a predetermined number of bits.

8. A method according to claim 6, wherein the error correcting encoding applied is an LDPC encoding, using a code symbol per block of transform coefficients.

9. A method according to claim 6, wherein the processing of the encoded auxiliary data further comprises a first error correction decoding using the encoded auxiliary data as parity symbols and the extracted concealment auxiliary data as code symbols.

10. A method according to claim 9, wherein a code symbol corresponds to block of transform coefficients, the first error correction decoding comprising:
marking each block containing at least one pixel for which a probability of correct reconstruction given by the corresponding error map is lower than a predetermined threshold as incorrect,
propagating correct symbols corresponding to blocks which are not marked as incorrect using the received parity symbols to obtain corrected symbols,
repeating the propagating of correct symbols based upon corrected symbols until no more symbols can be corrected, and
checking whether all symbols have been corrected in the propagating step.

11. A method according to claim 10, further comprising simplifying a parity matrix used by the first error correction decoding.

12. A method according to claim 9, wherein the modifying of the first decoded image comprises merging transform coefficients of blocks of coefficients with values corresponding to corrected symbols obtained by one of the first error correction decoding or a second error correction decoding.

13. A method according to claim 12, wherein the merging comprises, for at least one block of coefficients obtained from the first decoded image:
obtaining a quantized value of a coefficient of a given index of the block of coefficients,
comparing said quantized value with a corrected quantized value of the coefficient of same index obtained from a corrected symbol corresponding to the block of coefficients, and
in case of negative comparison, modifying the value of the coefficient based upon the corrected quantized value.

14. A method according to claim 5, wherein the processing of the encoded auxiliary data further comprises a second error correction decoding, applied bit by bit, using the item of information representative of reconstruction errors.

15. Method of decoding a sequence of digital images encoded according to a predictive format, using encoded auxiliary data, the encoded auxiliary data being representative of at least part of said sequence of digital images, the method comprising:
    decoding a current encoded image received with at least one detected error, including applying an error concealment decoding on at least part of the current encoded image containing such a detected error to obtain a first decoded image,
    obtaining an item of information representative of reconstruction errors based upon a reconstruction confidence of the error concealment decoding for at least one pixel of the part of the current image,
    processing the encoded auxiliary data and the first decoded image based upon the item of information representative of reconstruction errors to obtain corrected auxiliary data, and
    modifying the first decoded image to obtain a second decoded image based upon the corrected auxiliary data,
    updating the item of information representative of error based upon the corrected auxiliary data.

16. A method according to claim 15, wherein the updating comprises modifying the values of the error map corresponding to the first decoded image, the modifying including:
    for each pixel belonging to a block of pixels for which the corresponding block of transform coefficients comprises at least one transform coefficient modified during the modifying step, decreasing the value representative of the probability of correct reconstruction, and
    for each pixel belonging to a block of pixels for which the corresponding block of transform coefficients does not comprise any transform coefficient modified during the modifying step, increasing the value representative of the probability of correct reconstruction.

17. A method according to claim 16, wherein the updated error map is stored as a reference error map.

18. Device for decoding a sequence of digital images encoded according to a predictive format, using encoded auxiliary data, the encoded auxiliary data being representative of at least part of the sequence of digital images, the device comprising:
    a decoding unit configured to decode a current encoded image received with at least one detected error, the decoding unit applying an error concealment decoding on at least part of the current encoded image containing such a detected error to obtain a first decoded image,
    an obtaining unit configured to obtain an item of information representative of reconstruction errors based upon a reconstruction confidence of the error concealment decoding for at least one pixel of the part of the current encoded image,
    a processing unit configured to process the encoded auxiliary data and the first decoded image based upon the item of information representative of reconstruction errors to obtain corrected auxiliary data, and
    a modifying unit configured to modify the first decoded image to obtain a second decoded image based upon the corrected auxiliary data,
    wherein the item of information representative of errors is an error map including non-integer values associated with the first decoded image, comprising, for each pixel of the first decoded image, a real value $P_{x,y}$ representative of a probability of correct reconstruction associated to the decoded value of the pixel, such that: $0 \leq P_{x,y} 1$,
    wherein the current encoded image is encoded predictively with respect to a reference image according to a set of associated motion vectors, and wherein the obtaining unit obtains an item of information representative of reconstruction errors include obtaining a reference error map corresponding to the reference image, and propagating the reference error map according to the set of motion vectors to obtain a propagated error map,
    wherein the obtaining of an item of information representative of reconstruction errors further comprises combining the propagated error map with an error probability map comprising, for each pixel reconstructed by error concealment decoding, a value representative of a probability of correct reconstruction associated with the pixel.

19. A non-transitory computer-readable storage medium storing a computer program for causing a computer to decode a sequence of digital images encoded according to a predictive format, using encoded auxiliary data, the encoded auxiliary data being representative of at least part of said sequence of digital images, the computer program causing the computer to execute the steps of:
    decoding a current encoded image received with at least one detected error, including applying an error concealment decoding on at least part of the current encoded image containing such a detected error to obtain a first decoded image,
    obtaining an item of information representative of reconstruction errors based upon a reconstruction confidence of the error concealment decoding for at least one pixel of the part of the current encoded image,
    processing the encoded auxiliary data and the first decoded image based upon the item of information representative of reconstruction errors to obtain corrected auxiliary data, and
    modifying the first decoded image to obtain a second decoded image based upon the corrected auxiliary data,
    wherein the item of information representative of errors is an error map including non-integer values associated with the first decoded image, comprising, for each pixel of the first decoded image, a real value $P_{x,y}$ representative of a probability of correct reconstruction associated to the decoded value of the pixel, such that: $0 \leq P_{x,y} 1$,
    wherein the current encoded image is encoded predictively with respect to a reference image according to a set of associated motion vectors, and wherein the obtaining unit obtains an item of information representative of reconstruction errors include obtaining a reference error map corresponding to the reference image, and propagating the reference error map according to the set of motion vectors to obtain a propagated error map,
    wherein the obtaining of an item of information representative of reconstruction errors further comprises combining the propagated error map with an error probability map comprising, for each pixel reconstructed by error concealment decoding, a value representative of a probability of correct reconstruction associated with the pixel.

20. Device for decoding a sequence of digital images encoded according to a predictive format, using encoded auxiliary data, the encoded auxiliary data being representative of at least part of said sequence of digital images, the device comprising:
    a decoding unit configured to decode a current encoded image received with at least one detected error, including applying an error concealment decoding on at least part of the current encoded image containing such a detected error to obtain a first decoded image, an obtaining unit configured to obtain an item of information representative of reconstruction errors based upon a reconstruction confidence of the error concealment decoding for at least one pixel of the part of the current image, a processing unit configured to process the encoded auxiliary data and the first decoded image based upon the item of information representative of reconstruction errors to obtain corrected auxiliary data, and a modifying unit configured to modify the first decoded image to obtain a second decoded image based upon the corrected auxiliary data, an updating unit configured to update the item of information representative of error based upon the corrected auxiliary data.

* * * * *